Sept. 7, 1926.
M. RORABECK
1,599,288
COMBINED TRUCK AND BAG HOLDER
Filed Oct. 25, 1924   2 Sheets-Sheet 1
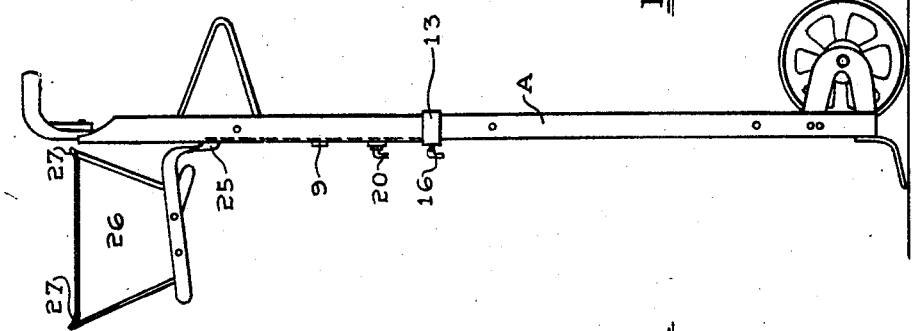
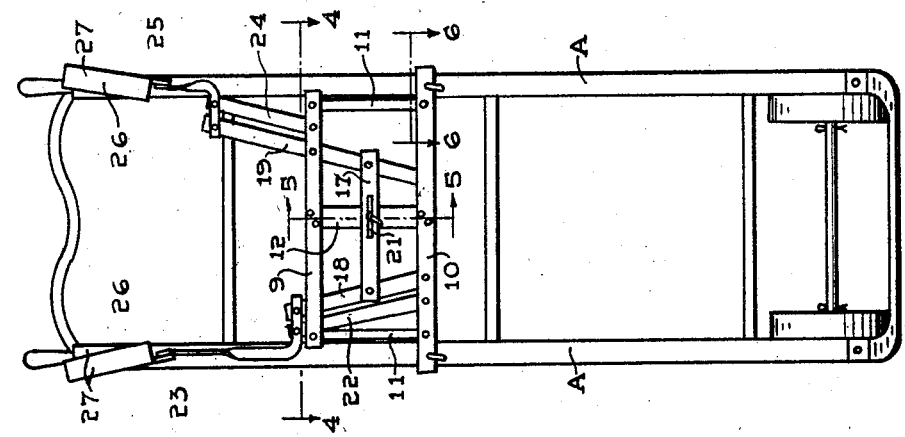
INVENTOR
MALCOLM RORABECK
By *his Attorney*

Sept. 7, 1926.
M. RORABECK
1,599,288
COMBINED TRUCK AND BAG HOLDER
Filed Oct. 25, 1924    2 Sheets-Sheet 2
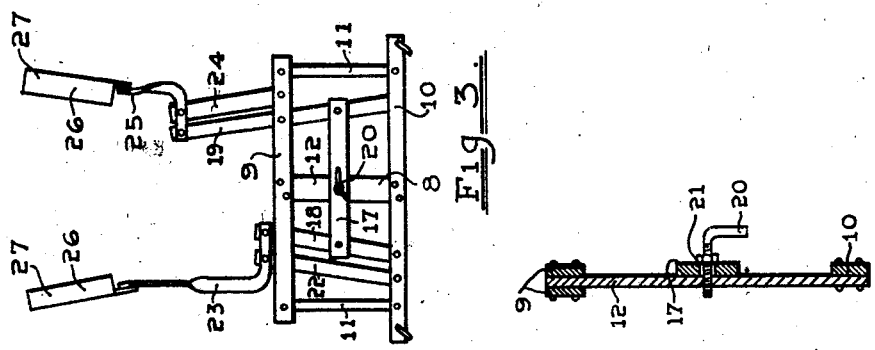
INVENTOR
MALCOLM RORABECK
By Wm. S. Fowler,
his Attorney Patented Sept. 7, 1926.

1,599,288

UNITED STATES PATENT OFFICE.

MALCOLM RORABECK, OF MILFORD, ONTARIO, CANADA.

COMBINED TRUCK AND BAG HOLDER.

Application filed October 25, 1924, Serial No. 745,865, and in Canada March 3, 1924.

My present invention relates to improvements in a combined truck and bag holder and has for its principal object to provide an ordinary truck with a bag holder having improved adjustable means which may be moved longitudinally of the truck to support bags of various lengths and laterally adjustable means to support bags of various widths.

A further object is the provision of such a device which may be readily mounted on a truck and removed therefrom and which need not interfere materially with the use of the truck as a porting means when secured thereto.

A further object is the provision of improved means for holding the mouth of the bag.

A further object is the provision of the device of the character described wherein the number of parts are few, the construction simple, and the cost of production relatively low.

To the accomplishment of these and related objects my invention resides in the construction, combination and arrangement of the various cooperating elements as shall be hereinafter more fully described, illustrated in the accompanying drawings and pointed out in the claims hereunto appended.

In the drawings forming a part of this disclosure, wherein like characters of reference designate like parts throughout the several views:—

Figure 1 is a front elevation of a truck with my bagger attached.

Figure 2 is a side elevation of Figure 1.

Figure 3 is a front elevation of the bagger removed from the truck.

Figure 4 is a section taken on the line 4—4 of Figure 1.

Figure 5 is a section taken on the line 5—5 of Figure 1.

Figure 6 is a section taken on the line 6—6 of Figure 1.

Figure 7 is a perspective elevation of a stand used, to support the bagger, in place of truck.

My bag holder comprises essentially a rigid frame 8 having a pair of spaced cross strips 9 and a cross strip 10, which may also be provided with a cooperating spaced strip. Joining these cross strips are a pair of end braces 11 and a centrally disposed brace 12 all being suitably joined to insure a rugged frame. The cross strip 10 is provided with angle ends 13 inturned at the bottom as at 14 and having the upstanding bottom flanges 15. These upstanding inturned angle ends being adapted to laterally embrace the angle frame members A of the truck or bag holder stand as in Figure 6.

The cross strips 9 are substantially shorter than the previously described cross strip 10 and are adapted to slidably receive intermediate their free ends the inner edge of the frame angle A as shown in Figure 4. Threaded in the ends of the strip 10, overlapping the top of the angle A, hand screws 16 are threaded to laterally engage the upper surface of the angle frames and clampingly retain the bag holder frame position.

Slidably transversely of the frame and carried by the centre brace 12 is the bag holding elements adjuster 17 pivotally connected at its ends with the outwardly extending pivotally mounted arms 18 and 19. This adjusting member 17 is connected to the centre brace by a manually operable screw 20 but is provided with a slot 21 to allow of sliding movement. When the screw 20 is loosened and the adjuster 17 moved toward the slide carrying the arm 19, it will draw the said arm inwardly, such arm 19 being pivoted to and between the strip 9 and extending exterior thereof. The same movement of the adjuster 17 will operate to bring the arm 18 inwardly also, the said arm 18 being hinged to the strip 10 slidably between and past the strips 9. Paralleling the arm 18 and also hingedly connected to the strip 10 is a brace 22 which connects with and supports, together with the arm 18, the bag holding bracket 23. A corresponding brace 24 hinges proximate of the arm 19 intermediate the strips 9 and extends outwardly to connect with, and support together with the arm 19, the bag holding bracket 25. The bag engaging elements 26 increasing in width as they extend upwardly from the brackets 23 and 25, include inwardly directed ends 27. The mouth of the bag is placed between the pair of holders 26, and the immediate top folded outwardly over the upper edge, the tension caused by the weight of the bag operating to cause the folded top to more securely embrace the supporting elements 26.

From the foregoing description taken in connection with the accompanying drawings, it will be manifest that the combined truck and bag holder as provided will fulfill all the requirements of such a device but as many changes could be made in the above description and many apparently widely different embodiments of my invention constructed within the scope of the appended claims without departing from the spirit or scope thereof, it is intended that all matters contained in the said accompanying specification and drawings shall be interpreted as illustrative and not in a limited sense.

What I claim as new is:—

1. In a device of the character described the combination with a truck or other stand having upright angle members, of a frame adapted to be slidably mounted thereon comprising a pair of cooperating spaced cross strips at one end, a cross strip at the opposite end being substantially longer than said first pair of cross strips, and side braces to space said pair of strips and said longer strip, means for securing said frame in a horizontal position, bag holding members carried by said frame and means for adjusting said bag holding members.

2. In a device of the character described the combination with a truck or other stand having upright angle members, of a frame adapted to be slidably mounted thereon comprising a pair of cooperating spaced cross strips at one end, a cross strip at the opposite end being substantially longer than said first pair and having inturned angle ends adapted to embrace the aforesaid upright angle members, and side braces to space said pair of strips and said longer strip, means for securing said frame in a horizontal position, bag holding members carried by said frame and means for adjusting said bag holding members.

3. In a device of the character described the combination with a truck or other stand having upright angle members, of a frame adapted to be slidably mounted thereon comprising a pair of cooperating spaced cross strips at one end, a cross strip at the opposite end being substantially longer than said first pair and having inturned angle ends adapted to embrace the aforesaid upright angle members, and side braces to space said pair of strips and said longer strip, means for securing said frame in a horizontal position comprising manually operable screws, threaded in said longer and angle ended frame member, adapted to contact with and clamp on said upright angle members, bag holding members carried by said frame and means for adjusting said bag holding members.

4. In a device of the character described the combination with a truck or other stand having upright angle members, of a frame adapted to be slidably mounted thereon comprising a pair of cooperating spaced cross strips at the one end, a cross strip at the opposite end being substantially longer than said first pair and having inturned angle ends adapted to embrace the aforesaid upright angle members, and side braces to space said pair of strips and said longer strip, means for securing said frame in a horizontal position comprising manually operable screws, threaded in said longer and angle ended frame member, adapted to contact with and clamp on said upright angle members, bag holding members flared at the top and having inturned sides carried by brackets pivotally mounted on and slidably carried by said frame ends and means for adjusting said bag holding members.

5. In a device of the character described the combination with a truck or other stand having upright angle members, of a frame adapted to be slidably mounted thereon comprising a pair of cooperating spaced cross strips at one end, a cross strip at the opposite end being substantially longer than said first pair and having inturned angle ends adapted to embrace the aforesaid upright angle members, and side braces to space said pair of strips and said longer strip, means for securing said frame in a horizontal position comprising manually operable screws, threaded in said longer and angle ended frame members, adapted to contact with a clamp on said upright angle member, bag holding members flared at the top and having inturned sides carried by brackets, and reinforced arms pivotally mounted on and slidably carried by said frame, for supporting said bag holding members, connected by a span having a manually operable clamp screw associated therewith, said arms being adapted to move outwardly on the shifting of said span in one direction and to move inwardly on the movement of the span in the reverse direction.

In testimony whereof I affix my signature.

MALCOLM RORABECK.